UNITED STATES PATENT OFFICE.

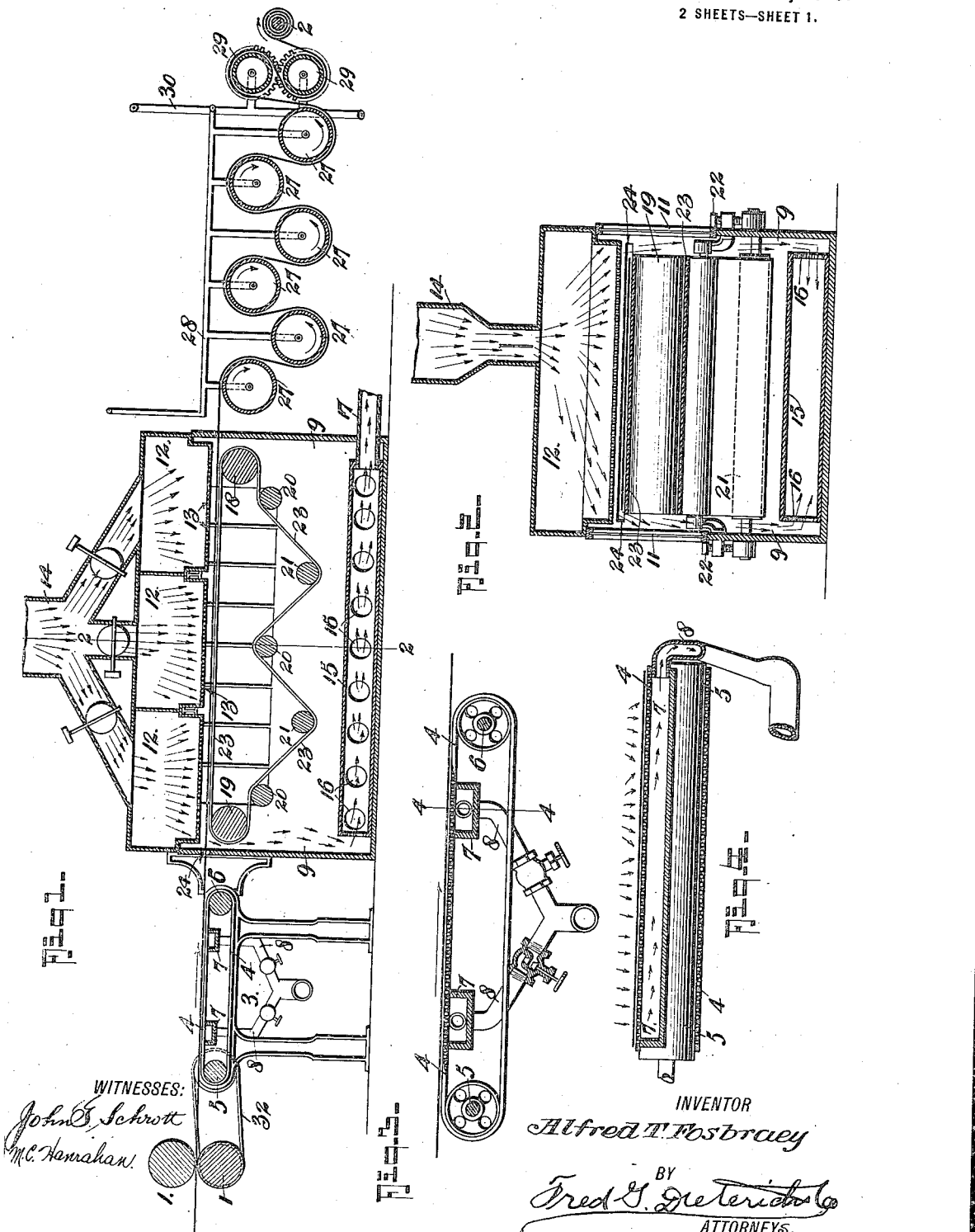

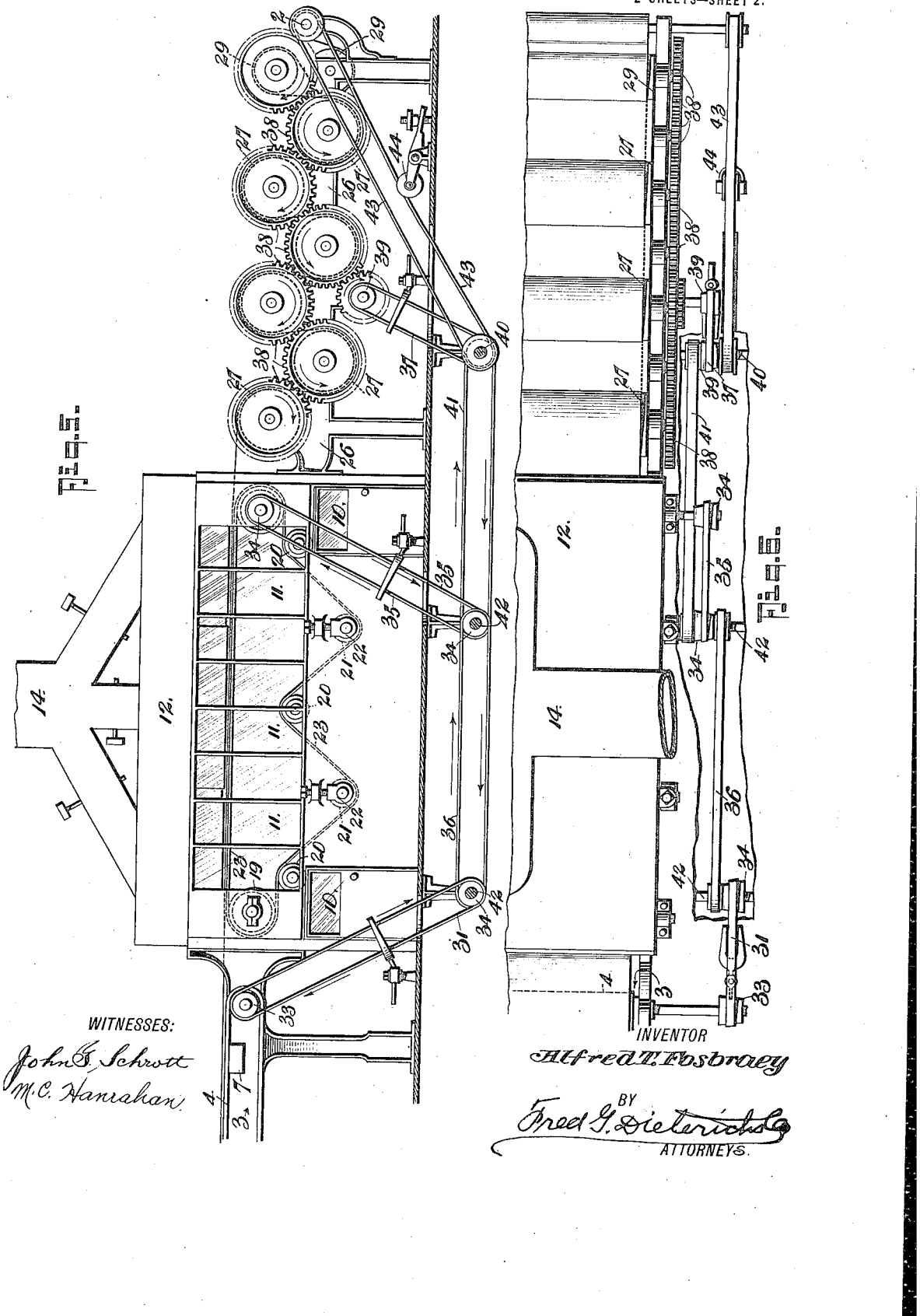

ALFRED THOMAS FOSBRAEY, OF NIAGARA FALLS, NEW YORK.

COATED-PAPER-DRYING APPARATUS.

1,144,896.

Specification of Letters Patent. Patented June 29, 1915.

Application filed August 29, 1914. Serial No. 859,241.

*To all whom it may concern:*

Be it known that I, ALFRED T. FOSBRAEY, a resident of Niagara Falls, in the county of Niagara and State of New York, have invented certain new and useful Improvements in Coated-Paper-Drying Apparatus, of which the following is a specification.

In the art of manufacturing lithograph paper, lithograph blanks, photograph paper, wall paper, sand paper, emery paper, etc., the chief method of drying the paper practised in the art today is as follows, to wit: as the paper leaves the coating machine, it is taken and hung up in loops or festoons. The paper cannot be touched on the coated or wet side without damaging it. As the paper hangs on sticks and forms loops, it travels along a rack lying on a chain which is driven very slowly. Usually there are about three hundred sticks to each drying apparatus and they travel around and around all the time. As soon as the sticks are emptied, they are fed back into the machine. The loops vary in length from 9½ feet to 4½ feet. The sticks are at first about 2½ feet apart and, as the outlet side of the apparatus is approached, the distance between the sticks is reduced to about 1 foot. This type of apparatus occupies, of necessity, considerable space. The drying rooms employing this type of apparatus with which I am familiar are usually from 250 to 300 feet long.

The principal disadvantage of the foregoing method of drying paper is in the waste paper it produces as, in the case of light paper particularly, that is paper weighing from 20 to 28 pounds per ream, the paper curls on the sides and causes much trouble and waste. The paper, having slack, stretches out of shape and does not lie well on the lithograph machine, and heavy paper, etc., owing to its weight cracks and "checks" where it hangs over the sticks.

My invention therefore has primarily for its object to provide a drying apparatus which will avoid the objectionable features above noted, and to provide an apparatus which will be inexpensive to manufacture and maintain in effective operation and one in which practically all waste is eliminated.

Generally speaking, the invention provides a means for conveying the paper from the coating machine to the winding up roller and during its passage not only keep the paper flat and taut and free from "checks" or cracks, but cause the moisture to be abstracted in transit and under such favorable conditions that a more rapid drying of the paper can be attained than by the old method above mentioned.

More subordinately my invention provides a primary drying room or chamber into which the paper is fed flat-wise from the coating machine by special intake conveyer, and in which chamber, the paper is carried flat-wise beneath a hot air duct that discharges a continuous current of hot air against the coated side of the paper. The paper passes from the entrance to the exit of this chamber on an endless apron, the paper lying with its uncoated side on the apron and its coated side in juxtaposition to the hot air duct. From the primary drying chamber, the paper passes from a set of final drying rollers which are preferably steam heated, and then over cooling rollers to reduce the temperature of the paper before it is wound up on the winding up roller. The object of passing the paper through the primary drying room is to abstract sufficient moisture from the paper in a short space of time to prevent the paper from sticking to the final drying rollers.

The invention also resides in those novel details of construction, combination and arrangement of parts, all of which will be first fully described, and then be specifically pointed out in the appended claims, reference being had to the accompanying drawings, in which:—

Figure 1 is a vertical longitudinal section, largely diagrammatic, illustrating my apparatus. Fig. 2 is a transverse section on the line 2—2 of Fig. 1. Fig. 3 is an enlarged vertical longitudinal section of the infeed conveyer. Fig. 4 is a cross section on the line 4—4 of Fig. 3. Fig. 5 is an enlarged detail side elevation, showing the manner of driving the infeed conveyer, the drying chamber conveyer and the final drying and cooling rollers. Fig. 6 is a detail top plan view of the parts shown in Fig. 5.

Referring now to the accompanying drawings in which like numerals and letters of reference designate like parts in all of the figures, 1 represents the coating machine from which the paper is conveyed to the winding up roller 2.

From the coating machine 1, the paper passes directly on to the infeed conveyer 3 which comprises a rubber endless belt 4 having perforations and passing over rollers 5 and 6. The paper is deposited with its uncoated side on the upper section of the conveyer 4 beneath which upper section, suction boxes 7 are located in which a partial vacuum is formed from a suitable suction duct 8, the conveyer rollers 5 and 6 being suitably mounted in bearings on a frame work, as shown.

9 is the primary drying chamber through the entrance 24 of which the paper is projected by the conveyer 4 onto the endless canvas belt or conveyer 23. The primary drying chamber 9 is provided with doors 10 through which access may be had to the interior of the chamber and is also provided with windows 11, through which the interior operations may be viewed.

12 designates the hot air duct which is preferably in section and forms the top of the chamber 9 and which is provided with perforations 13 through which a blast of dry hot air may be directed onto the upper or coated surface of the paper as it passes beneath the duct 12 over the conveyer 23. The hot air is delivered to the duct 12 from a suitable source, via the conduit 14 and the moist air is removed from the chamber 9 by a duct 15 located in the bottom of the chamber and having apertures 16 and a conduit 17 through which the moist air is withdrawn.

18 and 19 designate the main rollers over which the belt 23 is passed, the belt also passing over the idlers 20 and tension idlers 21, the latter being provided with suitable adjusting devices 22.

26 designates a suitable frame work which supports the final drying rollers 27 into which steam is led through the medium of steam pipes 28 from a suitable source of supply. There may be any number of steam drums or rollers 27, as conditions may make desirable, and from these final drying drums 27, the paper passes onto cooling drums 29 into which a suitable cooling fluid is conveyed by pipe 30 from a suitable source of supply.

The main drive is obtained from the coating machine 1 and is applied by a belt 32 to the conveyer 4 and from which power is taken to operate the conveyer 23 by means of cone pulleys 33—34 and belt connections 31—35 and counter-shafts 42 and a belt 36, and the rollers 27, and 29 through the medium of gearing 38 and a belt 37, and cone pulleys 39 from a counter-shaft 40, that is belted at 41 to the counter-shaft 42.

I prefer to make the pulleys 33, 34, and 39 as cone pulleys in order that the proper relative adjustment in speed of operation between the conveyers 4, 23 and belt gears 38 may be made to suit the requirement of the particular work desired, as certain papers shrink more than others at certain stages of their operations and hence it is advisable to provide for this condition. After the paper leaves the cooling rollers 29 it is wound up on the usual winding up roller 2 and is ready for further use, as desired. The roller 2 may be drawn by a belt 43, from the shaft 40 if desired, and a tension device 44 is employed to regulate the "slip" of the belt.

From the foregoing, it will be seen that by my construction, I have provided an apparatus that occupies a minimum amount of space and is so designed as to effectively dry the paper as it passes from the coating machine to the winding up rollers and at the same time keep the paper at all times flat, and taut, and prevent the same from curling or rolling up. Furthermore there are no sharp bends in the passage taken by the paper and hence the paper will not crack or "check".

From the foregoing description, taken in connection with the accompanying drawings, it is thought the complete construction, operation and advantages of my invention will be readily understood by those skilled in the art to which it appertains.

What I claim is:—

1. A paper drying apparatus comprising an infeed conveyer, a hot air drying chamber, a conveyer in said chamber on which the paper is carried through the chamber, means in said chamber for blowing a current of air over the coated side of said paper and a set of heated final drying rolls over which said paper passes on leaving said chamber.

2. A paper drying apparatus comprising an infeed conveyer, a hot air drying chamber, a conveyer in said chamber on which the paper is carried through the chamber, means in said chamber for blowing a current of air over the coated side of said paper and a set of heated final drying rolls over which said paper passes on leaving said chamber, and a set of cooling rolls over which said paper passes on leaving said drying rolls.

3. In an apparatus of the class described, a drying chamber, an endless belt conveyer within said chamber, an infeed conveyer on the outside of said chamber for carrying a paper strip into the chamber onto the endless belt, a hot air duct within said chamber located above said endless conveyer to direct a current of hot air onto said paper, an offtake duct for conveying away the moist air from the chamber, said chamber having transparencies in its walls through which the interior working may be viewed.

4. In an apparatus of the class described, a drying chamber, an endless belt conveyer within said chamber, an infeed conveyer on the outside of said chamber for carrying a paper strip into the chamber onto the endless belt, a hot air duct within said chamber located above said endless conveyer to direct a current of hot air onto said paper, an off-take duct for conveying away the moist air from the chamber, said chamber having transparencies in its walls through which the interior working may be viewed, and means for adjusting the tension of said endless conveyer whereby to maintain that portion which carries the paper in a horizontal plane.

5. In an apparatus of the class described, a drying chamber, an endless belt conveyer within said chamber, an infeed conveyer on the outside of said chamber for carrying a paper strip into the chamber onto the endless belt, a hot air duct within said chamber located above said endless conveyer to direct a current of hot air onto said paper, an off-take duct for conveying away the moist air from the chamber, said chamber having transparencies in its walls through which the interior working may be viewed, and a set of final drying rolls arranged in staggered succession over and under which the paper passes upon leaving said chamber, means for applying heat to said final drying rolls and means for driving said rolls and said conveyers.

6. In an apparatus of the class described, a drying chamber, an endless belt conveyer within said chamber, an infeed conveyer on the outside of said chamber for carrying a paper strip into the chamber onto the endless belt, a hot air duct within said chamber located above said endless conveyer to direct a current of hot air onto said paper, an off-take duct for conveying away the moist air from the chamber, said chamber having transparencies in its walls through which the interior working may be viewed, and means for adjusting the tension of said endless conveyer whereby to maintain that portion which carries the paper in a horizontal plane and a set of final drying rolls arranged in staggered succession over and under which the paper passes upon leaving said chamber, means for applying heat to said final drying rolls and means for driving said rolls and said conveyers.

7. In an apparatus of the class described, a drying chamber, an endless belt conveyer within said chamber, an infeed conveyer on the outside of said chamber for carrying a paper strip into the chamber onto the endless belt, a hot air duct within said chamber located above said endless conveyer to direct a current of hot air onto said paper, an off-take duct for conveying away the moist air from the chamber, said chamber having transparencies in its walls through which the interior working may be viewed, and a set of final drying rolls arranged in staggered succession over and under which the paper passes upon leaving said chamber, means for applying heat to said final drying rolls and means for driving said rolls and said conveyers, said driving means comprising a pulley, a power transmitting connection between said pulley and said final drying rolls, a power transmitting connection with said endless conveyer within the chamber and a power transmitting connection with said infeed conveyer.

8. In an apparatus of the class described, a drying chamber, an endless belt conveyer within said chamber, an infeed conveyer on the outside of said chamber for carrying a paper strip into the chamber onto the endless belt, a hot air duct within said chamber located above said endless conveyer to direct a current of hot air onto said paper, an off-take duct for conveying away the moist air from the chamber, said chamber having transparencies in its walls through which the interior working may be viewed, and means for adjusting the tension of said endless conveyer whereby to maintain that portion which carries the paper in a horizontal plane and a set of final drying rolls arranged in staggered succession over and under which the paper passes upon leaving said chamber, means for applying heat to said final drying rolls and means for driving said rolls and said conveyers, said driving means comprising a main drive pulley, a power transmitting connection between said pulley and said final drying rolls, a power transmitting connection with said endless conveyer within the chamber and a power transmitting connection with said infeed conveyer.

ALFRED THOMAS FOSBRAEY.

Witnesses:
JAMES W. CANARAN,
JAMES MULLANE.